(12) United States Patent
Carmack et al.

(10) Patent No.: US 7,400,697 B1
(45) Date of Patent: Jul. 15, 2008

(54) CLAD TUBE FOR NUCLEAR FUEL

(75) Inventors: William J. Carmack, Amherst, VA (US); Lewis C. Hartless, Madison Heights, VA (US); Jeffrey A. Halfinger, Lynchburg, VA (US)

(73) Assignee: BWX Technologies, Inc., Lynchburg, VA (US)

( * ) Notice: Subject to any disclaimer, the term of this patent is extended or adjusted under 35 U.S.C. 154(b) by 962 days.

(21) Appl. No.: 10/730,612

(22) Filed: Dec. 8, 2003

(51) Int. Cl.
  *G21C 3/07* (2006.01)
  *B32B 1/08* (2006.01)
  *B32B 15/02* (2006.01)
  *C25D 1/02* (2006.01)

(52) U.S. Cl. .................. 376/457; 428/655; 428/662; 205/73

(58) Field of Classification Search ............ None
See application file for complete search history.

(56) References Cited

U.S. PATENT DOCUMENTS

| | | | | |
|---|---|---|---|---|
| 3,024,522 A | * | 3/1962 | Cacciotti | 428/634 |
| 3,330,974 A | * | 7/1967 | Wilson | 376/321 |
| 5,824,425 A | * | 10/1998 | Mittendorf | 428/655 |
| 5,928,799 A | * | 7/1999 | Sherman et al. | 428/655 |
| 6,381,949 B1 | * | 5/2002 | Kreiner et al. | 60/258 |

FOREIGN PATENT DOCUMENTS

JP     52-4994    *   1/1977

\* cited by examiner

*Primary Examiner*—John J Zimmerman
(74) *Attorney, Agent, or Firm*—D. Neil LaHaye

(57) ABSTRACT

A rhenium lined niobium alloy tube for use as a clad tube for nuclear fuel in a nuclear reactor. The tube is produced by an electro deposit process. A graphite mandrel is placed in the electro deposit chamber as the cathode material. Refined rhenium stock is used as the anode material. The chamber is filled with the chloride electrolyte. The chamber is closed and the electrolyte bath is heated. Current and voltage applied across the anode and cathode cause the rhenium to be deposited on the mandrel. Refined niobium alloy is then used as the anode material and applied over the rhenium on the mandrel to a desired thickness. The part is removed from the chamber and ground to the desired outside diameter. The graphite mandrel is removed from the tube.

3 Claims, 4 Drawing Sheets

CLAD TUBE FOR NUCLEAR FUEL

BACKGROUND OF THE INVENTION

1. Field of the Invention

The invention is generally related to nuclear fuel rods and more particularly to a clad tube with a rhenium liner that is produced by an electro deposit process.

2. General Background

Numerous materials have been investigated for use as cladding for uranium nitride nuclear fuel. Near the end of the SP-100 space nuclear reactor program clad development was focused on a fuel pin design having a Nb (niobium)-1% Zr (zirconium) outer shell with a rhenium liner. The purpose of this design was two-fold. First was that the 1% Zr would be reduced by the free contaminant oxygen found in the niobium alloy. Second was that the rhenium also provided a boost in creep strength over an unlined Nb-1% Zr tube. The outer niobium alloy was generally a powder metallurgy fabricated tube that typically had trace (~1,000 ppm) impurities of oxygen. Since lithium was to be the reactor coolant, any free oxygen was scavenged from the clad by the lithium. This led to pitting in the pure niobium material and, ultimately, to clad/fuel failure. It was found that by adding 1% Zr to the niobium, the zirconium would "tie up" the free oxygen such that the lithium could not getter it from the clad and, hence, not form pits in the clad. The inner rhenium liner protects the niobium alloy from chemical attach by the uranium nitride fuel.

The method of manufacture of the tubes during the SP-100 program was not direct and required subsequent forming to achieve a finished product. The basic process was a complicated forming of powder metallurgy rhenium sheet, followed by a multi-step rolling operation to form the rhenium into a tube shape. The tube seam was then EB (electron beam) welded along its length to form a closed tube. The rhenium tube was then slid into a close tolerance fit niobium tube and a specially developed braze/weld performed to join the rhenium and niobium. This resulting clad was then loaded with fuel and seal welded.

SUMMARY OF THE INVENTION

The invention addresses the above problems. What is provided is a rhenium lined niobium alloy tube for use as a clad tube for nuclear fuel in a nuclear reactor. The tube is produced by an electro deposit process. A graphite mandrel is placed in the electro deposit chamber as the cathode material. Refined rhenium stock is used as the anode material. The chamber is filled with the chloride electrolyte. The chamber is closed and the electrolyte bath is heated. Current and voltage applied across the anode and cathode cause the rhenium to be deposited on the mandrel. Refined niobium alloy is then used as the anode material and applied over the rhenium on the mandrel to a desired thickness. The part is removed from the chamber and ground to the desired outside diameter. The graphite mandrel is removed from the tube.

BRIEF DESCRIPTION OF THE DRAWINGS

For a further understanding of the nature and objects of the present invention reference should be made to the following description, taken in conjunction with the accompanying drawing in which like parts are given like reference numerals, and wherein.

DETAILED DESCRIPTION OF THE PREFERRED EMBODIMENT

Figure 1:
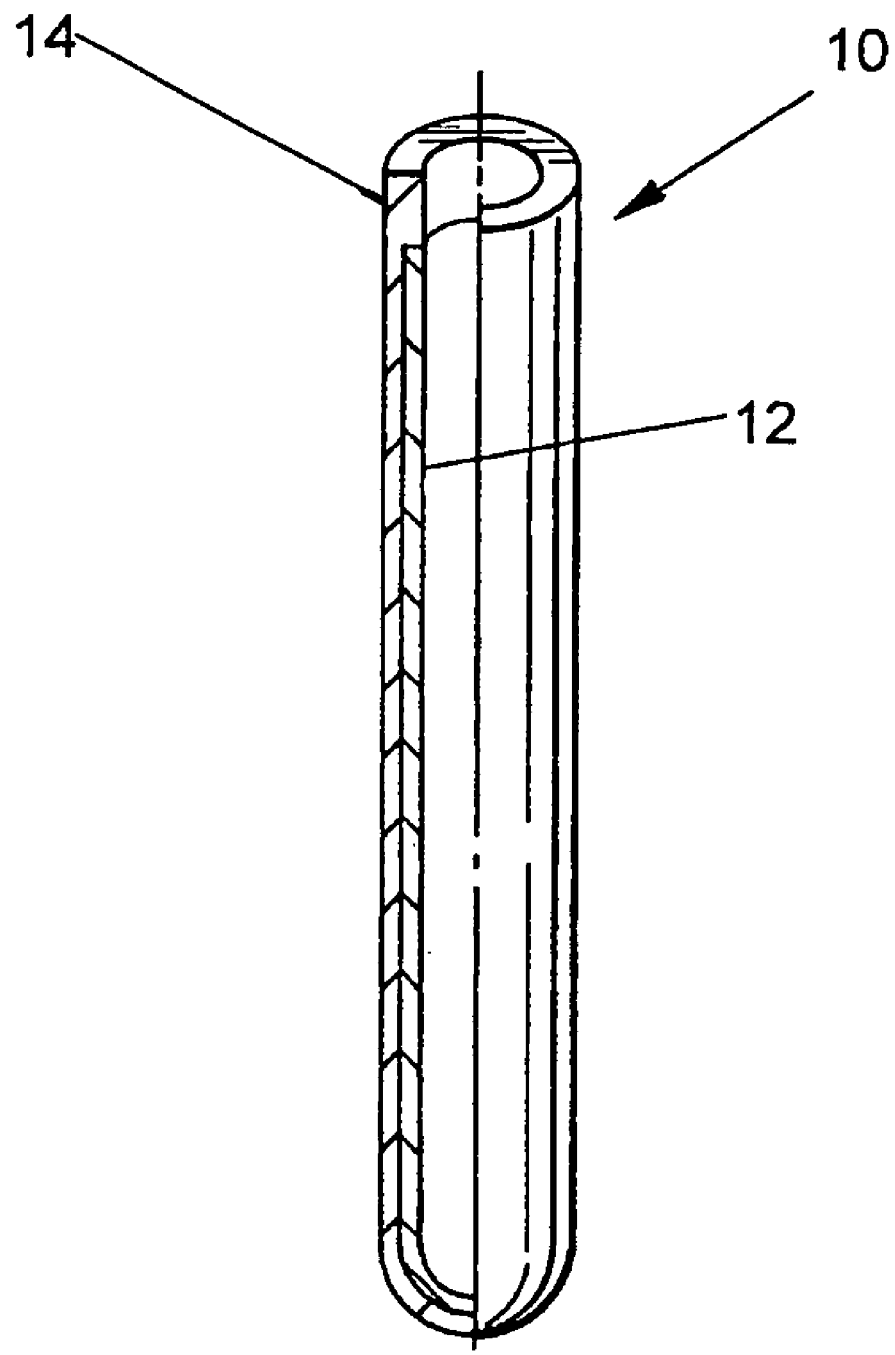
FIG. 1 is a longitudinal, partial section view of the tube.

Referring to the drawings, FIG. 1 illustrates an example of a clad tube formed by the process described below. The tube 10 is generally comprised of an inner liner of rhenium 12 and outer layer of niobium alloy 14.

The process of forming the tube is comprised of several steps.

Figure 2:
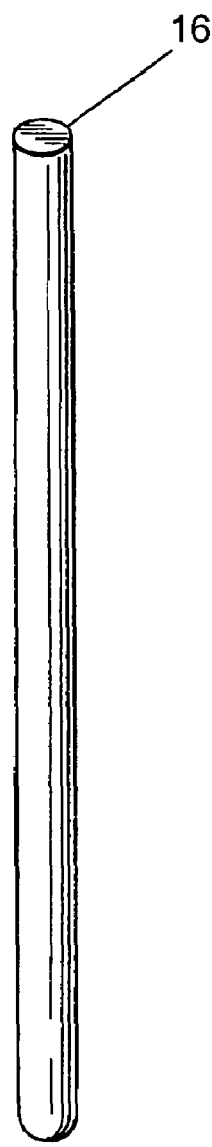
FIG. 2 is a longitudinal view of the graphite mandrel.
Figure 3:
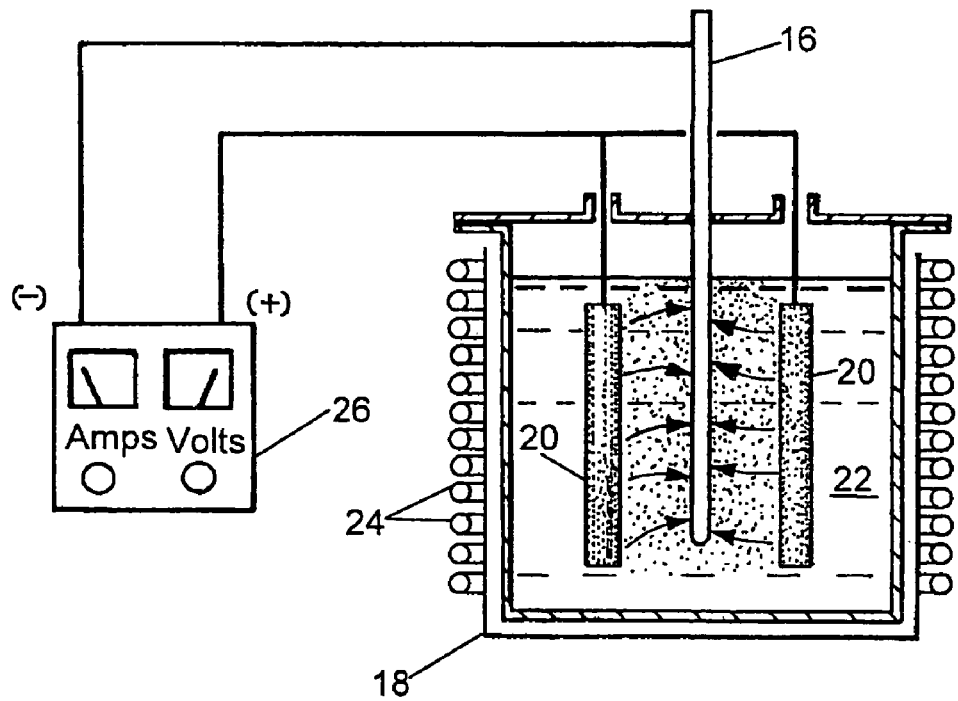
FIG. 3 is a schematic drawing of the electro-deposit process depositing metal on the graphite mandrel.

A graphite mandrel 16, seen in FIG. 2, that has been machined to the desired final geometry of the inner diameter of the tube 10 is placed in an electro deposit chamber 18 as the cathode material as illustrated in FIG. 3.

Figure 4:
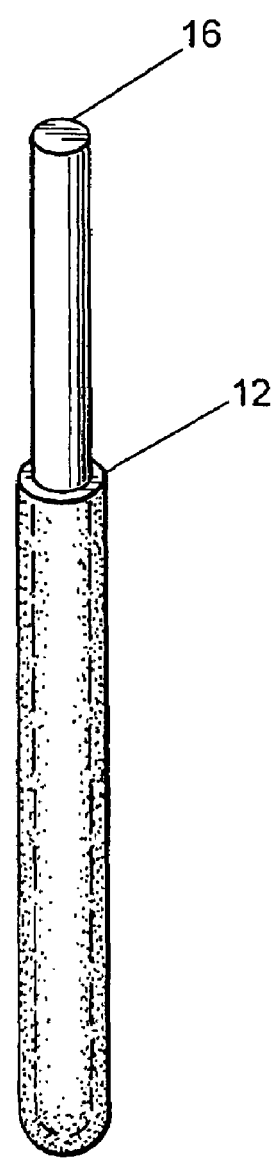
FIG. 4 is a longitudinal view of the graphite mandrel with the first layer of metal deposited.
Figure 5:
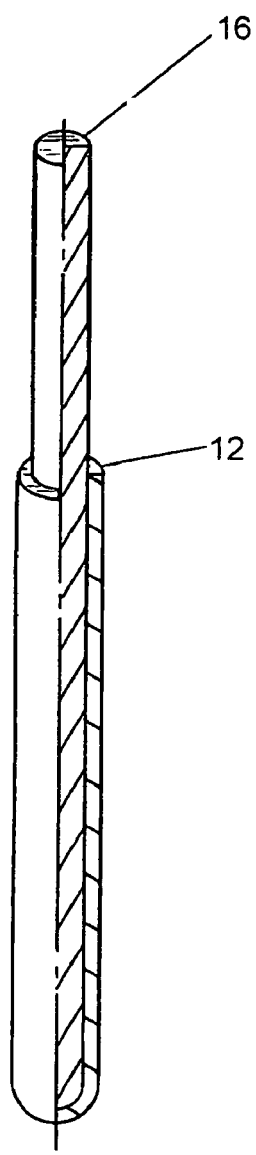
FIG. 5 is a longitudinal, partial section view of the graphite mandrel with first layer of metal deposited to a known thickness.

Rhenium stock 20 is placed in the electro deposit chamber 18 as the anode material. It is preferable to use refined rhenium. The chloride electrolyte 22 is placed in the electro deposit chamber 18. The chamber 18 is sealed and heating elements 24 are used to heat the electrolyte 22 to a desired temperature at less than 800 degrees Celsius. The electrolyte is a non-toxic molten salt mixture. Current and voltage are applied from a power source 26 to the mandrel cathode 16 and the rhenium stock anode 20. This causes the release of rhenium into the electrolyte 22 and the deposition of rhenium on the mandrel cathode 16. The current and voltage is applied until a desired thickness of rhenium is deposited on the mandrel to form the inner liner 12 of rhenium for the clad tube. The mandrel 16 with the rhenium deposited thereon is best seen in FIGS. 4 and 5.

Figure 8:
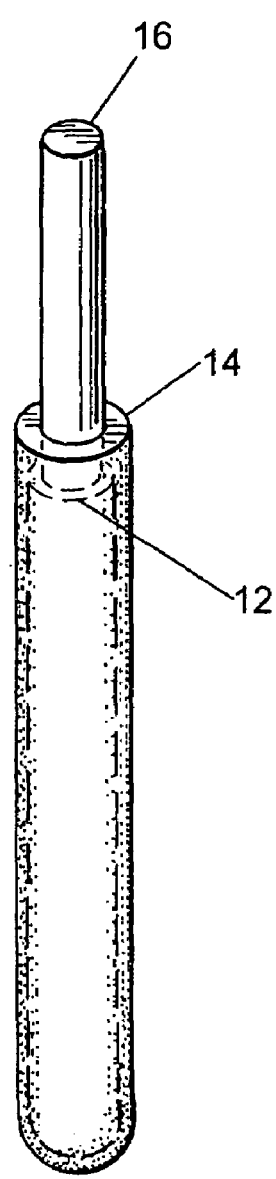
FIG. 8 is a longitudinal view of the graphite mandrel, rhenium layer, and niobium alloy layer following machining of the niobium alloy layer to final outside diameter and prior to removal of the graphite mandrel.
Figure 6:
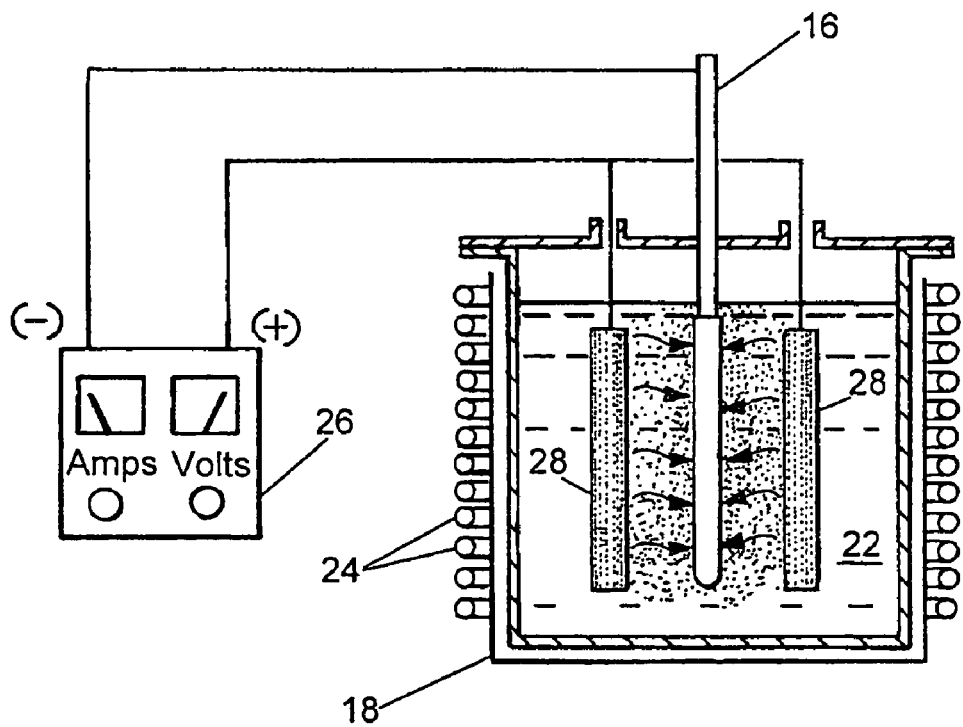
FIG. 6 is a schematic depiction of the electro-deposit process depositing a second layer of metal (niobium alloy) on top of the first layer (rhenium) of metal.
Figure 7:
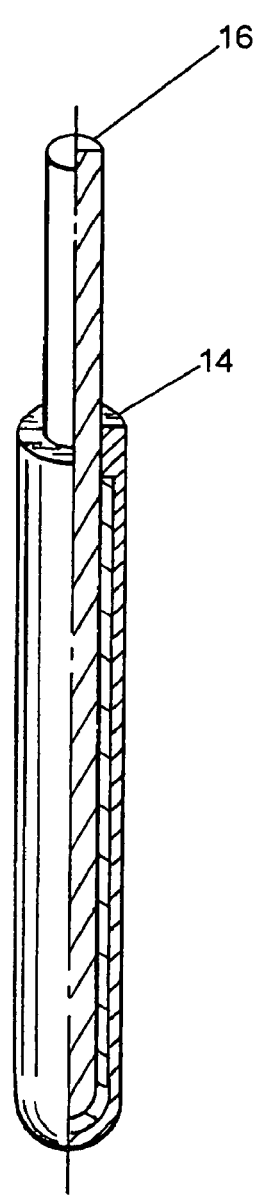
FIG. 7 is a longitudinal, partial view of the graphite mandrel with two layers of metal deposited.

The electrolyte solution 22 is allowed to cool and the mandrel 16 is removed from the electro deposit chamber 18. As seen in FIG. 6, the rhenium stock anode 20 is replaced with a niobium alloy stock anode 28. The electrolyte solution 22 is heated to a desired temperature at less than 800 degrees Celsius. Current and voltage are applied to the mandrel cathode 16 and niobium alloy stock anode 28. As above, this causes the release of niobium alloy into the electrolyte and the deposition of the niobium alloy on the rhenium that was previously deposited on the mandrel 16. The deposition process is continued until a desired thickness of the niobium alloy is deposited on the rhenium liner 12. The mandrel 16 with the niobium alloy deposited thereon is best seen in FIGS. 1, 7, and 8. If it is desired to have the open end of the tube 10 be solid niobium as seen in FIGS. 1, 7, and 8 the mandrel 16 is lowered into the electrolyte 22 below the level of the rhenium deposited on the mandrel 16 before beginning the process to deposit the niobium.

The mandrel 16 may be rotated during the electro deposit process to assist in uniform deposition.

Figure 9:
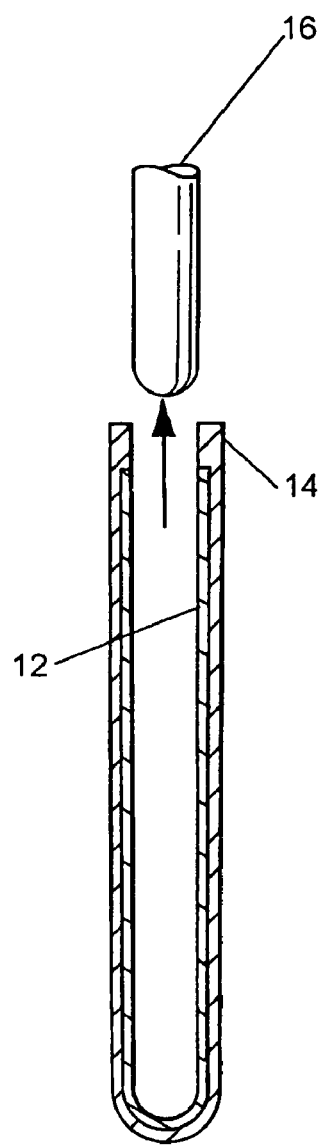
FIG. 9 is a longitudinal view of the finished bilayer tube following removal of the graphite mandrel.

The current and voltage is shut off after the desired layer of niobium alloy is achieved and the chloride electrolyte is allowed to cool. The mandrel 16 is removed from the chamber and the niobium alloy is ground to the final outside diameter. As seen in FIG. 9, the formed tube 10 is then removed from the graphite mandrel 16 by a combination of machining and etching to yield a close tolerance tube 10.

An advantage of using this electroforming process to form the clad tube 10 is that it allows the formation of multi-layer products using materials that are not normally suitable for welding together. The process results in an atomic level bonded interface between the differing metal alloys. Another advantage is that the electroforming process is less expensive, faster, and more uniform than the method employed during the SP-100 program. The tubes are more uniform than those produced during the SP-100 program because subsequent forming is not required to achieve the finished product.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed is:

1. A clad tube for nuclear fuel made by the process comprising steps:
   a. placing a graphite mandrel in an electro deposit chamber as the cathode material;
   b. placing rhenium stock in the electro deposit chamber as the anode material;
   c. filling the electro deposit chamber with chloride electrolyte;
   d. closing the electro deposit chamber;
   e. heating the electrolyte bath to a desired temperature;
   f. depositing rhenium on the mandrel to a desired thickness by applying current and voltage across the anode and cathode;
   g. machining the rhenium on the mandrel to a final desired close tolerance dimension;
   h. placing niobium alloy stock containing zirconium in the electro deposit chamber as the anode;
   i. heating the electrolyte bath to a desired temperature;
   j. depositing niobium alloy over the rhenium to a desired thickness by applying current and voltage across the anode and cathode while creating an atomic level bonded interface;
   k. removing the mandrel from the electro deposit chamber and grinding the formed clad tube for nuclear fuel to a desired outer diameter; and
   l. removing the formed tube from the mandrel.

2. The clad tube of claim 1, wherein the electrolyte bath is heated to a temperature less than eight hundred degrees centigrade.

3. The clad tube of claim 1, wherein the mandrel is lowered into the electrolyte bath below the level of the rhenium deposited on the mandrel prior to the step of depositing niobium alloy over the rhenium.

\* \* \* \* \*